2,789,958
RESINOUS REACTION PRODUCTS OF POLYEPOXIDES AND POLYSULFIDE POLYMERS AND METHODS OF MAKING THE SAME

Edward M. Fettes and John A. Gannon, Trenton, N. J., assignors, by mesne assignments, to Thiokol Chemical Corporation, Trenton, N. J., a corporation of Delaware No Drawing. Application October 30, 1951, Serial No. 253,983

23 Claims. (Cl. 260—42)

This invention relates to resinous reaction products of polyepoxides and polythio polythiols and polythio polyhydroxy compounds.

The polythio polythiols may be symbolized by the formula $$H(SRS)_x(SR'(SH)_nS)_yH$$

where $x$ varies from 2 to 10, $y$ varies from 0 to 10, $n$ varies from 0 to 2. They are made in accordance with the teachings of U. S. Patent 2,466,936 to Patrick et al., dated April 12, 1949, to which reference is made. It is to be realized that in any given quantity of the polythio polythiols or polythio polyhydroxy compounds of this invention, there is an almost infinite number of individual molecules and all of them do not have the same values of $x$ and $y$, and that those values represent a statistical average. Very frequently, as shown by the specific examples hereinafter set forth, those average values are fractional rather than whole numbers.

The radicals R and R' have the same definition as that set forth in said patent, that is, they are radicals selected from the group consisting of:

designating a single carbon atom,

designating two adjacent carbon atoms and

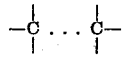

designating two carbon atoms joined to and separated by intervening structure.

The radical R has a free valence of only 2 and R' a free valance equal to one of the integers 2, 3 and 4. Said free valences are attached to different carbon atoms. Particular classes of said radicals are alkylene radicals, ethylenically unsaturated aliphatic hydrocarbon radicals, saturated aliphatic oxahydrocarbon and thiahydrocarbon radicals and araliphatic hydrocarbon radicals in which the free valences are in the aliphatic portion. Examples of said radicals are shown in Tables I and II below.

TABLE I
(Radicals having a free valence of 2)

—(CH₂)ₙ—(n=1 to 10)
CH₃CHCHCH₃
  |  |
CH₃CHCH₃
  |  |
C₂H₅CHCH₂CHC₂H₅
  |  |
—CH₂CHCH₂—
     |
     CH₃
—C₂H₄OC₂H₄OC₂H₄—
—CH₂OCH₂—
—CH₂SCH₂—

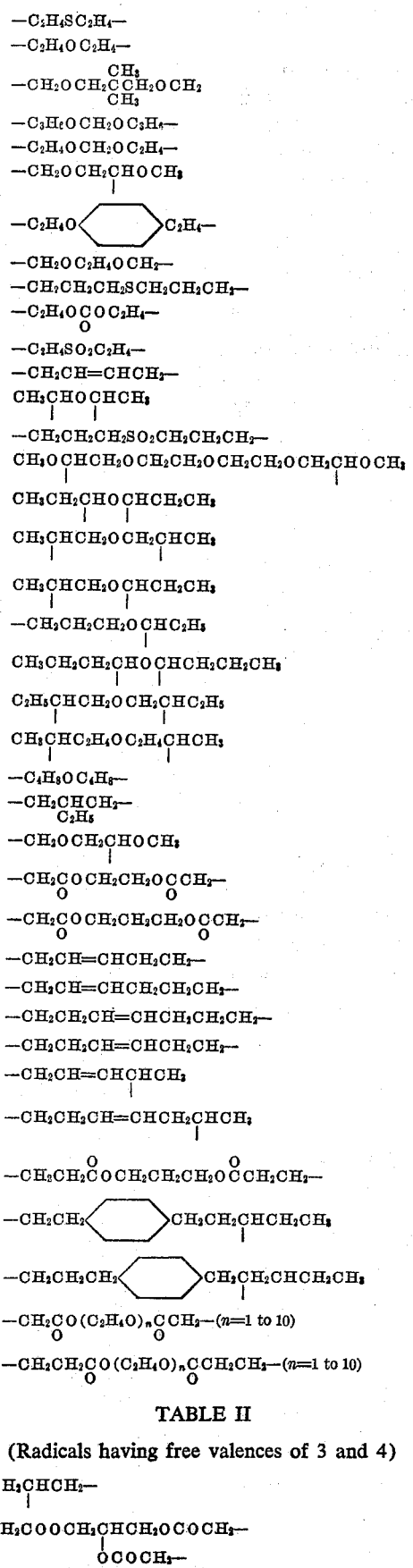

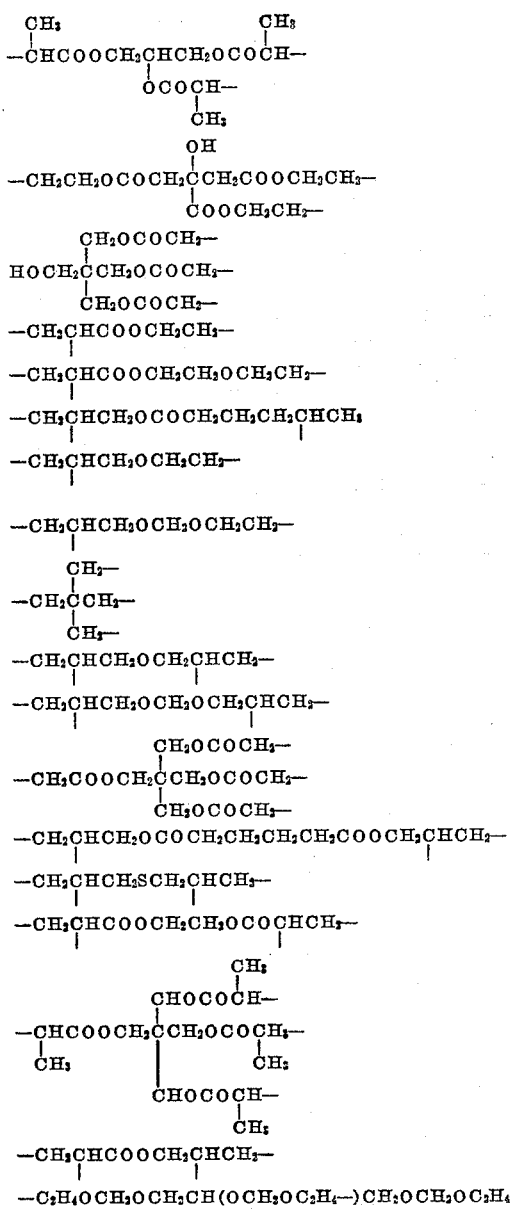

The said polythio polythiols vary in consistency from thin or readily flowable liquids to viscous semisolids, depending upon the degree of polymerization, that is, the magnitude of the values $x$ and $y$. One of their outstanding advantages is that they may be converted to tough rubber-like solids and find wide use as coating and impregnating compounds as well as casting compounds. In that conversion, commonly known as curing, oxidizing agents have been employed, particularly heavy metal peroxides, as for example, lead peroxide, zinc peroxide. Such conversion is attended by the evolution of water by condensation of the hydrogen of the mercapto groups with oxygen of the oxidizing agent and that water evolution causes a number of disadvantages including shrinkage and porosity of the product. Moreover, the existence of the water of condensation and metallic compounds dispersed throughout the product impair the electrical qualities of the product.

In accordance with the present invention the polythio polythiols and polythio polyhydroxy compounds are cured by reaction with polyepoxide compounds, i. e. compounds containing at least two epoxide groups. As a result satisfactory curing occurs and the mentioned disadvantages are overcome.

The properties of the cured compounded products of this invention are outstanding in respect to their electrical properties. This is rather surprising because the electrical properties of the previously known polysulfide polymers are not outstanding. The products have the usual good solvent and chemical resistance of the polysulfide polymers as well as their low temperature properties.

These properties, as well as the ease of mixing and curing make the process of this invention of immediate obvious value for use in making protective coatings and envelopes which may be sprayed, painted or cast in place. The electrical uses are far greater than those open to the polysulfide polymers cured in the conventional manner. The use of these materials for potting compounds is clear in view of their ability to flow into place, completely covering and protecting every part in a transformer case. In addition, the use of a hard type of cured polymer permits the cured product to support and hold the parts in place. Finally, the mixture can be cold cured in the case. Another use is in cable blocks where electrical cables are kept under the pressure of an inert gas. In this case, the polymer can be mixed, injected into the cable and allowed to cure in situ to the desired properties. It is obvious that a hot cure inside a lead covered cable might prove difficult of achievement, so that the cold cure of the present invention offers a real advantage. This invention is useful in general in producing metal- and solvent-free cured products. Another use is in the field of rocket propellants as a binder for the propellant.

The polythio polyhydroxy compounds used in this invention may be symbolized by the formula:

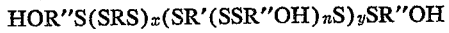

where $x$, $y$, $n$ and R and R' have the definition previously given in connection with the symbol for the polythio polythiols, and R'' has the same generic definition as R but may be specifically different.

The said polythio polyhydroxy compounds may be prepared from polythio polythiols by reacting the latter with mercaptans having the general formula

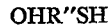

where R'' has the definition already given, in accordance with Fettes Patent 2,606,173.

The two classes of compounds, namely, polythio polythiols and polythio polyhydroxy compounds are symbolized by the general formula

where $n$, $x$, $y$, R and R' have the definition already given and F is a radical of the group consisting of —SR''OH and S''SH.

The polythio polyhydroxy compounds have the distinct commercial advantage over the polythio polythiols of freedom from unpleasant odor and the present invention provides means of curing the polythio polyhydroxy compounds far superior to anything previously known, both as to method and products obtained.

Examples of polyepoxide curing agents are shown in the following

TABLE III

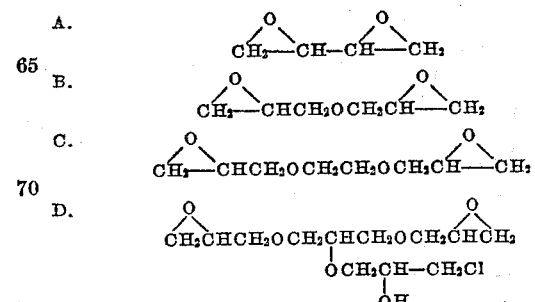

E. Bakelite Epoxide RD-51-12, an epoxide resin stated by the manufacturer to have an epoxide functionality somewhat greater than 2.

F. Shell Epoxide XC-3, stated by the manufacturer to have an epoxide functionality of 3.6.

G. Shell Epon 1204-2. This is reported to be a diepoxide made by reacting bis-phenol A with epichlorhydrin. Bis-phenol A is made by condensing 2 mols of phenol with 1 mol of acetone.

The important or critical character of the above mentioned curing agents is that they must have at least two epoxide groups. If they possess that critical property the remaining structure of said curing agents is unimportant. In other words, the curing agents must be at least bi-functional in respect of epoxide groups and they may possess a functionality greater than two. As noted above, curing agents E and F have epoxide functionalities greater than two. For example, curing agent F, Shell Epoxide XC-3, has an epoxide functionality of 3.6 and is apparently a mixture of polyepoxide compounds, some having a functionality of 3 and others having a functionality of 4, so that the average functionality is 3.6, none of the components of said curing agent having a functionality less than 2. In accordance with the present invention all compounds having two or more epoxide groups are employed as curing agents.

The proportion of the curing agent to the materials to be cured, that is, polythio polythiol or polythio polyhydroxy compounds varies over a wide range, depending to a large extent on the molecular weight of the initial polythio polythiol or polythio polyhydroxy compound.

The lower the molecular weight of the initial material the greater is the proportion of curing agent necessary to effect the desired curing action. In general the proportion of polyepoxide curing agent varies from about 10% to about 50% of the total, but in some cases may be increased to as much as 70% or 80%, or decreased to 2-5%.

The curing reaction of this invention does not require heating because it will occur at room temperature, e. g. 25° C. To accelerate the reaction, higher temperatures may be employed, although it is generally desirable not to use temperatures sufficiently high to cause vaporization or boiling of the curing agent. In general, temperatures of 25°–150° C. are indicative of the range of temperatures of the curing reaction, the higher temperatures in this range being employed with polyepoxide curing agents having sufficiently high boiling points, or low vapor pressures.

The curing reaction is facilitated by aliphatic amines and that class of compounds in general is used as catalysts. However, the use of such catalysts is not critical because the curing action will proceed in the absence thereof.

Specific examples of the above mentioned amine catalysts are as follows:

Ethylene diamine
Diethylene triamine
Triethylene tetramine
Diethylamine
Butylamine
Methyldiethanol amine
Diethanol amine The proportions of said catalysts may vary from about 0.25 to 10% by weight of the total.

The invention will be defined in the claims and illustrated by specific examples.

The polythio polythiol used in Example 1 has the following formula

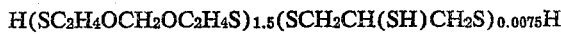

Polythio polythiol A has the formula

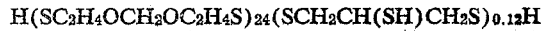

Polythio polythiol B has the formula

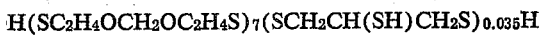

The above polythio polythiol A is made according to Example XII of U. S. Patent 2,466,963 using ¼ the quantity of trichlorpropane therein specified and the above mentioned polythio polythiol B is made according to Example XIII of said patent using ¼ of the quantity of trichlorpropane (1,2,3) therein specified. The polythio polythiol used in Example 1 is similarly made except that the proportions of sodium sulfhydrate and sodium sulfite in relation to the polymeric unit are increased sufficiently to obtain the increased degree of splitting to give the specific values of the polymeric units shown. The specific proportion of the sulfhydrate splitting agent for that purpose is 0.66 equal to $1/x$ where $x$ equals ⅙, it being sufficiently accurate to base the proportion of splitting agent on the formal unit because of the relatively negligible proportion of the remainder of the molecule.

The polythio polyhydroxy compound used in Examples 5a, 6, 7 and 8 may be made by the following method:

*Example A.*—Proceed as in Example XII of U. S. Patent 2,466,963, using 0.04 mol of the tris-(betachlorethyl formal) of glycerine (prepared by condensing 3 mols ethylene chlorohydrin, 3 mols formaldehyde and 1 mol glycerine) instead of 0.04 mol of 1,2,3 trichlorpropane. The liquid polythio polythiol polymer thus prepared and while still in the form of a latex is converted to the corresponding polythio polyhydroxy compound by treatment with mercapto ethanol according to Example 5 of the application of Edward M. Fettes, Serial No. 213,475, filed March 1, 1951, said treatment being as follows:

A volume of the latex containing about 166 grams of polymer is mixed with ⅒ gram mol (7.8 grams) of mercapto ethanol. The latex is then heated to a temperature of from about 40° to 100° C. with stirring for a period of about 10 hours to allow the initial step of the action to proceed. Thereafter atmospheric air is bubbled through the latex for a period of 48 hours to oxidize all sulfhydryl terminals. The resulting latex is then coagulated by the addition of dilute acid to a pH of approximately 4 and the resulting coagulum is a liquid responding to the formula:

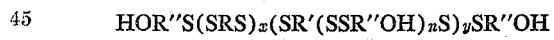

where

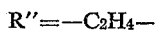
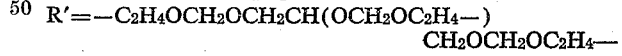

$n=1$
$x=24$
$y=0.48$

In the above formula instead of the specific radicals R″ and R, any of the radicals shown in Table I having a free valence of 2 may be used, and instead of the specific radical R′ in the above formula, any of the radicals shown in Table II and having a free valence of 3 may be used. It will be noted that the radical R″ in the above specific formula is derived from the mercapto ethanol, the radical R is derived from the dichlorodiethyl formal and the radical R′ is derived from the tris-(betachlorethyl formal). Instead of mercapto ethanol in Example A, any hydroxy mercaptan derived from the radicals in Table I having a free valence of two where one of said free valences is satisfied by hydroxyl and the other by sulfhydryl may be employed. Instead of dichlordiethyl formal, any dichlorinated compound corresponding to the radicals of Table I having a free valence of two where each of said free valences is satisfied by a chlorine atom may be employed. Instead of tris-(beta-chlorethyl formal), any trichlorinated compound having any of the radicals of Table II having three free valences where each of said free valences is satisfied by a chlorine atom may be employed.

Instead of tris (betachloroethyl formal) any tetrachlorinated compound having any of the radicals of Table II having four free valences, where each of said four free valences is satisfied by a chlorine atom may be employed, in which case the value of $n$ in the above formula becomes 2.

An alternative method of making a polythio polyhydroxy compound for use in Examples 5a, 6, 7 and 8 is as follows:

*Example B.*—This compound is made by condensing dithiodiglycol, glycerine and paraformaldehyde with the elimination of water to produce a cross linked polythio polyhydroxy compound responding to the formula

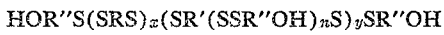

$$HOR''S(SRS)_x(SR'(SSR''OH)_nS)_ySR''OH$$

where $$x=85$$
$$y=1.6$$
$$n=1$$

The ingredients are mixed together in the following proportions:

| | |
|---|---|
| Dithiodiglycol | 2213 grams—98 mol percent. |
| Paraformaldehyde | 420 grams—100 mol percent. |
| Glycerol | 25.6 grams—2 mol percent. |

To this mixture there is added 500 cc. of benzene and 21 cc. of concentrated sulfuric acid to act as a catalyst in the formation of the polymer. The mixture is refluxed and water produced in the condensation is caught in a trap allowing the reaction to go to completion. After the formation of water became extremely slow, the mixture was neutralized, filtered through glass wool and the benzene was removed by warming the reaction product under a vacuum. The resultant polythio polyhydroxy compound was a viscous liquid having a viscosity of 225 poises and a hydroxyl content of .22% and having an average molecular weight of 15,470.

*Example 1*

100 parts of curing agent G and 1.5 parts of diethylene triamine were mixed with 25 parts of polythio polythiol. This material was cured by allowing to stand 4 hours and 30 minutes at room temperature followed by 15 minutes at 70° C. and then 30 minutes at 100° C. The relatively large amount of curing agent was necessitated by the very low molecular weight of the polythio polythiol. At the end of the cure there was none of the characteristic odor of the polythio polythiol and the product was a non-tacky, hard, tough polymer. This loss of odor indicated that the polythio polythiol was actually cured into the compound and was not merely an admixture with the curing agent.

If the above polythio polythiols were cured by the conventional method, that is, by the use of lead peroxide, there would be danger of combustion since a large proportion of peroxide would be necessary to effect the cure. A large proportion of the curing agent is also used in this example because of the very low molecular weight of the polythio polythiol. However, the cure proceeds smoothly without any danger of combustion.

*Example 2*

| | Parts |
|---|---|
| Polythio polythiol A | 5 |
| Polythio polythiol B | 5 |
| Curing agent E | 10 |
| Dimethylaminomethyl phenol | 0.25 |

The materials were mixed thoroughly and allowed to stand 3 hours at room temperature. By the end of this time a hard, tough, rubbery mass was obtained which had excellent electrical properties and which could be advantageously used for a potting composition or an impregnant. This material on extraction for 6 hours using chloroform at the reflux temperature gave a zero extract indicating that the polythio polythiol was thoroughly cured.

*Example 3*

| | Parts by weight |
|---|---|
| Polythio polythiol A | 7.5 |
| Polythio polythiol B | 7.5 |
| Curing agent E | 10 |
| Dimethylaminomethyl phenol | 0.25 |

The properties of this material on curing for three days at room temperature, i. e. 25° C. were similar to those of the previous example but the product was somewhat softer.

*Example 4*

This example shows the production of a firm, tough rubber composition having good electrical properties:

| | Parts |
|---|---|
| Polythio polythiol A | 17.5 |
| Polythio polythiol B | 17.5 |
| Curing agent E | 10 |
| Dimethylaminomethyl phenol | 0.25 |

This material cured up on standing 3 days to a tough but rubbery material.

*Example 5*

Proceed as in Example 4 using 20 parts by weight of polythio polythiol A instead of 17.5 parts and 20 parts by weight of polythio polythiol B instead of 17.5 parts.

The product formed in this case was softer than that formed in previous Example 4.

The products formed in the above five (5) examples on heat ageing at 230° F. for 2 days showed very little change, i. e. good stability. The products produced in accordance with Examples 4 and 5 became somewhat shorter, that is, had a lower elongation but retained good chemical and electrical properties. After the ageing test they do not give any extract when subjected to toluene or chloroform extraction for 6 hours at reflux temperature.

*Example 5a*

Proceed as in Example 5 using 20 parts of polythio polyhydroxy compound instead of polythio polythiol B.

In this instance the cured product is very similar to that of Example 5, but has less elongation on stretching.

*Example 6*

| | Parts |
|---|---|
| Polythio polyhydroxy compound | 5 |
| Curing agent E | 4 |
| Dimethylaminomethyl phenol | 0.133 |

These materials were mixed together and allowed to stand for 16 hours at 70° C. The product cured during this time to a firm rubber having a Shore durometer hardness of 48. The product was stable after 3 days' heating at 212° F. and retained its good electrical and chemical properties. Extraction with toluene for 5 hours at reflux temperature gave no extract.

*Example 7*

Proceed as in Example 6 but allow to cure spontaneously by standing 60 hours at room temperature, that is, 25° C. The same physical properties were obtained.

*Example 8*

| | Parts |
|---|---|
| Polythio polyhydroxy compound | 2.2 |
| Curing agent F | 3.5 |
| Diethylene triamine | 1 |

This compound cured in 2 hours at room temperature to give a material having a high resilience but too low elongation. This low elongation resulted from the high cross linking tendency of the curing agent F due to the presence of more than two epoxide groups.

In all of the above examples an amine was used as a catalyst. Such catalyst is, however, not necessary or critical and the following example shows a cure effective without any catalyst:

*Example 9*

| | Parts |
|---|---|
| Polythio polythiol B | 100 |
| Curing agent D | 30 |

These materials were mixed, heated to 70° C. for 6 hours, then allowed to stand for 2 days at room temperature, 25° C. The mixture had by that time cured to a tough, rubbery polymer. The product of this example is advantageously used in impregnating leather, textiles, etc. and will cure in situ.

All of the polymers used in the above examples are normally liquid, i. e. at 25° C. and it will be noted that the curing method transformed them into solid rubbery or hard plastic materials. Instead of the specific diepoxide curing agents used in said examples, any polyepoxide compound can be used, including specifically any compound in Table III.

What is claimed is:

1. Process which comprises incorporating a polyepoxide curing agent with a polymer of the group consisting of polythio polythiols symbolized by the formula $$H(SRS)_x(SR'(SH)_nS)_yH$$

and polythio polyhydroxy compounds symbolized by the formula $$HOR''S(SRS)_x(SR'(SSR''OH)_nS)_ySR''OH$$

and mixtures thereof where x varies from 2 to 100, y varies from 0 to 10, n varies from 0 to 2, the radicals R and R'' having only two free valences and R' having a free valence equal to one of the integers 2, 3 and 4, all of said free valences being attached to different carbon atoms, R, R' and R'' being radicals of the group consisting of alkylene radicals, ethylenically unsaturated aliphatic hydrocarbon radicals, saturated aliphatic oxahydrocarbon and thiahydrocarbon radicals and araliphatic hydrocarbon radicals in which the free valences are in the aliphatic portion, and reacting said polyepoxide curing agent with said polymer at temperatures of 25° C. to 150° C.

2. Process which comprises incorporating a polyepoxide curing agent and an aliphatic amine catalyst with a polymer of the group consisting of polythio polythiols symbolized by the formula $$H(SRS)_x(SR'(SH)_nS)_yH$$

and polythio polyhydroxy compounds symbolized by the formula $$HOR''S(SRS)_x(SR'(SSR''OH)_nS)_ySR''OH$$

and mixtures thereof where x varies from 2 to 100, y varies from 0 to 10, n varies from 0 to 2, the radicals R and R'' having only two free valences and R' having a free valence equal to one of the integers 2, 3 and 4, all of said free valences being attached to different carbon atoms, R, R' and R'' being radicals of the group consisting of alkylene radicals, ethylenically unsaturated aliphatic hydrocarbon radicals, saturated aliphatic oxahydrocarbon and thiahydrocarbon radicals and araliphatic hydrocarbon radicals in which the free valences are in the aliphatic portion, and reacting said polyepoxide curing agent with said polymer at temperatures of 25° C. to 150° C.

3. Process which comprises incorporating a polyepoxide curing agent with a polythio polythiol symbolized by the formula $$H(SC_2H_4OCH_2OC_2H_4S)_x(SCH_2CH(SH)CH_2S)_yH$$

where x varies from 2 to 100 and y varies from 0 to 10, and reacting said polyepoxide curing agent with said polymer at 25° C. to 150° C.

4. Process which comprises incorporating a polyepoxide curing agent with a polythio polyhydroxy compound symbolized by the formula $$HO(C_2H_4)S(SC_2H_4OCH_2OC_2H_4S)_x$$
$$(SCH_2CH(SSC_2H_4OH)CHS)_yS(C_2H_4)OH$$

where x varies from 2 to 100 and y varies from 0 to 10, and reacting said polyepoxide curing agent with said polymer at temperatures of 25° C. to 150° C.

5. Process which comprises incorporating a polyepoxide curing agent and an aliphatic amine catalyst with a polythio polythiol symbolized by the formula $$H(SC_2H_4OCH_2OC_2H_4S)_x(SCH_2CH(SH)CH_2S)_yH$$

where x varies from 2 to 100, y varies from 0 to 10, and reacting said polyepoxide curing agent and amine with said polymer at temperatures of 25° C. to 150° C.

6. Process which comprises incorporating a polyepoxide curing agent and an aliphatic amine catalyst with a polythio polyhydroxy compound symbolized by the formula $$HO(C_2H_4)S(SC_2H_4OCH_2OC_2H_4S)_x$$
$$(SCH_2CH(SSC_2H_4OH)CHS(_yS(C_2H_4)OH$$

where x varies from 2 to 100 and y varies from 0 to 10, and reacting said polyepoxide curing agent and amine with said polymer at temperatures of 25° C. to 100° C.

7. A product made according to the process of claim 1.

8. A sulfur-containing resinous product obtained by reacting a polyepoxide with a liquid aliphatic polythiopolymercaptan having a molecular weight of about 500 to 12,000 and selected from the class consisting of saturated hydrocarbon polythiopolymercaptans and saturated oxahydrocarbon polythiopolymercaptans.

9. A sulfur-containing resinous product obtained by reacting a polyepoxide with a polythiopolymercaptan of the general formula $$HS(CH_2CH_2OCH_2OCH_2CH_2SS)_n$$
$$CH_2CH_2OCH_2OCH_2CH_2SH$$

where n is an integer from 1 to 50 and in which the ratio of epoxy groups to the number of thiol groups in the reactants is at least one.

10. A sulfur-containing resinous product obtained by reacting a polyepoxide with a liquid aliphatic saturated oxahydrocarbon polythiopolymercaptan and in which the ratio of epoxy groups to the number of thiol groups in the reactants is at least one.

11. A sulfur-containing resinous product obtained by reacting a polyepoxide with a liquid aliphatic saturated oxahydrocarbon polythiopolymercaptan.

12. A resinous product according to claim 11 and wherein said polyepoxide is a polyglycidyl ether of a polyhydric phenol.

13. A resinous product according to claim 12 and wherein said polyglycidyl ether is a diglycidyl ether of diphenylolpropane.

14. A resinous product according to claim 11 and wherein said polyepoxide is butadiene dioxide.

15. An article having a metallic surface and, firmly adherently bonded thereto, the resinous product of claim 11.

16. A resinous product obtained by reacting a polyepoxide with a liquid aliphatic saturated oxahydrocarbon polyhydroxypolysulfide polymer.

17. An article having a metallic surface and, firmly adherently bonded thereto, the resinous product of claim 16.

18. A resinous product obtained by reacting a polyepoxide with a liquid aliphatic saturated oxahydrocarbon polyhydroxy polymer, the polyepoxide being present to the extent of 5% to 80% by weight of the reaction mixture.

19. A resinous product obtained by reacting a polyepoxide with a liquid aliphatic saturated oxahydrocarbon polyhydroxypolysulfide polymer in the presence of a small amount of an organic amine as a catalyst.

20. Process according to claim 1 wherein said curing agent is a diglycidyl ether of diphenylolpropane.

21. Process according to claim 1 and wherein said curing agent is butadiene dioxide.

22. Process according to claim 1 and wherein said curing agent is diglycidyl ether.

23. Process according to claim 1 and wherein said curing agent is the bis glycidyl ether of ethylene glycol.

References Cited in the file of this patent

UNITED STATES PATENTS 2,592,560     Greenlee _____ Apr. 15, 1952